Figure 1:
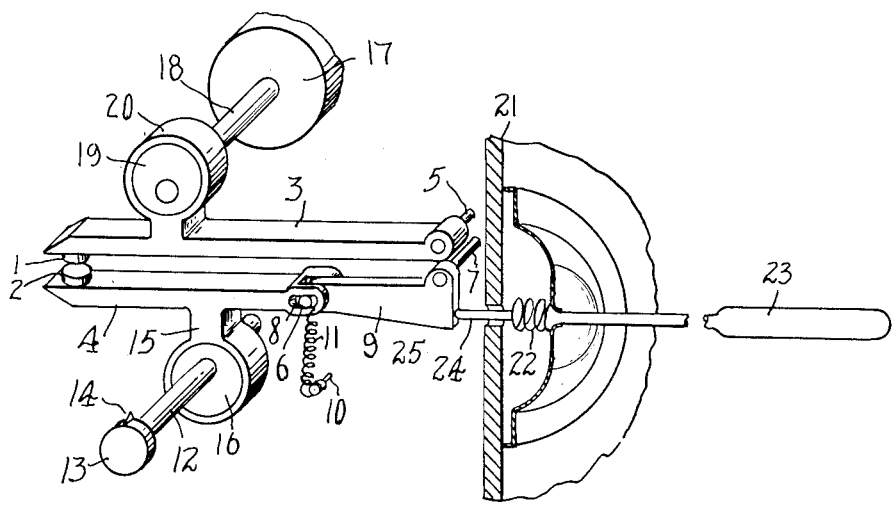

Dec. 27, 1955 D. V. TUTTLE 2,728,829
CONTROL DEVICE FOR ELECTRIC HEATING CIRCUITS
Filed Jan. 4, 1954

INVENTOR.
DANIEL VERN TUTTLE
BY
Oberlin + Limbach
ATTORNEYS.

United States Patent Office 2,728,829
Patented Dec. 27, 1955

2,728,829

CONTROL DEVICE FOR ELECTRIC HEATING CIRCUITS

Daniel Vern Tuttle, Kirkland, Ill., assignor to Ferro Electric Products, Inc., Kirkland, Ill., a corporation of Ohio Application January 4, 1954, Serial No. 402,035

3 Claims. (Cl. 200—136.3)

This invention relates as indicated to control devices for electric heating circuits.

The apparatus of the present invention is designed to make possible a more uniform control over the temperature which is to be maintained by the heating elements in the circuit in which the control device is to be employed. Two modes, of varying degrees of effectiveness, for maintaining constant the temperature maintained by an electric heating unit are: first, a simple thermostat which opens and closes the heating circuit as the temperature rises and falls above a pre-selected value; and second means which automatically cyclically energize and de-energize the heating circuit so as to have the heating element supply a predetermined number of heating units per unit of time to the space or device which is to be heated.

The use of a simple thermostatically controlled on and off switch is generally effective to maintain the mean value of the temperature at a predetermined value, however, the fluctuations of the temperature necessary to cause the thermostat to operate, of necessity, require that the temperature fluctuate on opposite sides of the pre-selected value by amounts which vary in accordance with the sensitivity of the thermostat and the associated control mechanism which is employed. For many installations such as in household appliances, for example cooking stoves and the like, where the control devices must be rugged, low in cost, and capable of operating with a reasonable degree of certainty over long periods of time, there is generally a sacrifice of sensitivity in favor of ruggedness and low cost. In consequence the temperature in devices such as cooking ovens in domestic stoves vary quite widely from the value which is selected for example by the control knob on the particular utensil.

The second way of controlling the temperature, as indicated above, is to provide a means for cylically energizing and de-energizing the heating circuit, the temperature level being dependent upon the duration of the off periods, or more accurately, the relationship between the durations of the on and off periods. Control devices of this character have the advantages over the thermostatically controlled system just described in that a much more uniform temperature is maintained, however, these on and off devices can merely approximate the desired temperature level to be maintained since the value at which the temperature is kept is dependent entirely upon the number of B. t. u.'s which the heating circuit will supply during a particular interval of time. As conditions of heat dissipation vary, as by opening and closing of oven doors, change in the effectiveness of the heat insulating material, etc., the constant value at which on and off control devices of this character maintain the temperature in an oven for instance will shift so that there is no assurance that the temperature at which the oven is maintained will be truly at the value selected.

It is a principal object of the present invention to provide a device which combines both of these types of control, incorporating the desirable benefits of each and at the same time overcoming the deficiencies of each.

Other objects of my invention will appear as the description proceeds.

To the accomplishment of the foregoing and related ends, the invention, then comprises the features hereinafter fully described and particularly pointed out in the claims, the following description and the annexed drawing setting forth in detail one illustrative embodiment of the invention, this being indicative, however, of but one of the various ways in which the principle of the invention may be employed.

Figure 2:
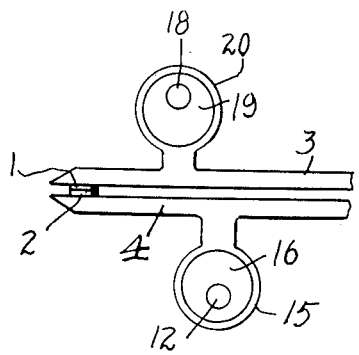

In said annexed drawing:

Fig. 1 is a perspective view of the essential elements of the apparatus comprising my invention; and Fig. 2 is a fragmentary view of the apparatus illustrated in Fig. 1 showing a slightly different relationship between the essential parts.

Broadly stated, my invention comprises a control device for electric heating circuits which has in combination:

(a) a pair of make and break contact members;

(b) actuating means for cyclically relatively moving said contact members so that during a part of the time span of each of re-occurring cycles said contact members will be in closed condition and during any remainder of each such time span said members will be in open condition;

(c) manually adjustable means for varying the time duration relationship between said open and closed conditions in each such time span; and (d) thermostatically controlled means for varying the time duration relationship between said open and closed condition in each such time span.

In the illustrated embodiment of my invention presently to be described, the manually adjustable means identified under (c) above and the thermostatically controlled means identified under (d) above are inter-connected so that their effect is algebraically cumulative.

More specifically, the control device of my invention comprises means for controlling an electric heating circuit which comprises the combination of:

(a) first and second make and break contact members adapted for connection in such circuit;

(b) means, moving cyclically with substantially constant amplitude, for moving said first contact member toward and away from said second contact member whereby the time duration, if any, of the time span of each such cycle of movement during said contact members are closed depends upon the physical location of said second contact member in the path of movement of said first contact members, (c) means for adjustably supporting said second contact member comprising,
  (I) a fulcrum member,
  (II) a lever, carrying said second contact member supported by said fulcrum,
  (III) manually actuatable means engageable with said lever for variously fixing the relationship of said lever with respect to the fulcrum; and
  (IV) thermostatically controlled means for changing the location of said fulcrum.

Having thus defined my invention in general terms, a full understanding of the apparatus which I have devised as one means for accomplishing the stated results, is illustrated in Fig. 1 wherein first and second contact members 1 and 2 are respectively carried by arms 3 and 4. The arm 3 is pivotally supported on a pin 5 which is adapted to be mounted on the back plate of the frame enclosing the device, but which plate has been omitted so as not to obscure the essential features of the control device. The second contact member 2 mounted on arm 4 is likewise pivotally supported, but its support through the lever 4 is on a first fulcrum pin 6 and a second fulcrum pin 7.

The inner end of the arm 4 is bifurcated with the bifurcative portions slotted as at 8 so as to receive a pin 6 carried by the second fulcrum arm 9. The pin 7 by which the fulcrum arm 9 is pivotally supported is mounted also in the back plate which supports the fulcrum pin 5. Another pin 10 likewise carried by the back plate enclosing the apparatus carries a spring 11 which at its upper end is connected to the end of the fulcrum arm 4 and is normally under tension so as to rotate the fulcrum arm 4 about the axis of a control shaft 12. The control shaft 12 is likewise journalled in the stationary back plate housing the apparatus and may be moved to any adjusted angular position by means of the knob 13 which carries a suitable indicator 14.

The fulcrum arm 4 carries an extension 15 provided with a circular or cylindrical opening in which is rotatably supported an eccentric 16 which is keyed to or otherwise secured to the control shaft 12.

Likewise mounted on the back plate of the machine is an electric motor generally indicated at 17, the shaft 18 of which has terminally mounted thereon the eccentric 19. The eccentric 19 is rotatable in a cylindrical opening in an extension 20 carried by the upper fulcrum arm 3.

Mounted in a side plate 21 housing the apparatus is a bellows 22 which is connected with a thermostat 23 which may be for example of the fluid-filled type, and located in the area, the heat or temperature of which is to be controlled by the apparatus being described. As the temperature on the thermostat varies, the bellows 22 will move the pin 24 to the right or left depending on the temperature and the forward end of the pin 24 bears against the heel 25 of the fulcrum arm 9. When the apparatus as thus illustrated and described is used for the purpose of controlling a heating element in a domestic electric range such as the surface or oven units, the electric motor 17 will rotate at a relatively slow speed on the order of from 1 to 4 or more revolutions per minute. As the shaft 18 is rotated by the motor 17 the eccentric 19 operating in the circular or cylindrical enlargement 20 on the arm 3 will cause the latter to carry the contact member 1 down into and out of engagement with the other contact member 2. The time span of each cycle of movement of the contact member 1 during which, the contacts are closed, will depend upon the physical location of the contact member 2 in the path of movement of the contact member 1. At this point it should be noted that the arms 3 and 4 are formed of sufficiently flexible material so that after the contact members 1 and 2 have moved into engagement, the overtravel, if any, of the eccentric 19 will merely cause a bending of the arm supporting the contact members without doing any damage thereto.

As the contact member 1 is thus cyclically moved by constant amplitude and at a frequency depending upon the speed of rotation of the motor shaft 18, the time interval during which the contact members are closed will depend upon the position of the fulcrum pin 6 and the eccentric 16.

By manual control of the knob 13 turning the shaft 12 and rotating the eccentric 16, the contact member 1 may be so far retracted from the contact member 2 that regardless of the extent to which the eccentric 19 moves the contact member 1 downwardly the latter will never engage the contact member 2. In this condition the unit is in the fully "off" position.

When, however, the operator decides to energize the heating circuit and have the temperature of the oven for example maintained at a predetermined value, the operator will rotate the knob 13 to a predetermined setting as indicated by indicia on a dial, not shown, with which the knob 13 will be associated. If this setting of the knob 13 is such that for normal operation of the apparatus the heating circuit would be energized for only 50% of the time, then during the interval when the unit is coming up to heat the circuit would be closed for only 50% of the time also if it were not for the provision of the movable fulcrum pin which is actuated by the thermostat in the manner now to be described.

When the oven is cold the bellows of course will retract the pin 24 to the right causing the pin 6 to move downwardly and the spring 11 causes the right-hand end of the arm 4 to follow such pin. This shift in the position or location of the fulcrum pin 6 will just be enough so as to move the contact member 2 upwardly about the axis of the shaft 12 until it is fairly out of engagement with the contact member 1. The parts should be so adjusted that under these conditions of cold in the oven as just described, the contact members 1 and 2 should never be moved into engagement when the position of the eccentric 16 is such as would be indicated by an "off" condition of the knob 13.

With the pin 24 retracted to the right by the extent indicated under the influence of thermostat 23, any substantial movement of the extension 15 upwardly under the influence of the eccentric 16 by rotation of the knob 13 will cause the contact members 1 and 2 to move so closely together that they are at all times in engagement irrespective of the position of the eccentric 19. As the motor 17 is then energized by an inter-locking circuit arrangement not shown, the current will be on continuously until the temperature in the oven causes the thermostat to extend the pin 24 to the left. When this happens the pin 6 will move upwardly causing the contact member 2 to rotate counter-clockwise about the axis of the shaft 12 so that as the temperature in the oven approaches the desired value, the rotation of the eccentric 19 will close and maintain closed the contact members 1 and 2 for only, say 50%, of the total time.

It will thus be seen by combining algebraically the effectiveness of the thermostatically controlled device and the manually controlled device, it is possible to maintain a uniform temperature at the proper value in the oven or on the surface unit at all times. If the on and off device energized by the motor 17 were used alone, there would be maintained in the oven or surface unit a uniform temperature but, as indicated above and for the reasons explained, that uniform temperature might not coincide with the value desired by the operator. The effect of the thermostat is to thus shift the uniform temperature line from that at which it would ordinarily be maintained by the motor 17, so as to coincide with the desired level at which it is to be maintained without, however, the wide swings or fluctuations which are normally characteristic of simple thermostatically controlled circuits.

Fig. 2 has been included merely to show a different relationship between the parts under certain specific conditions of operation and is readily understandable from the description which has just been given. Like reference characters are employed to designate like parts in Fig. 2.

While the illustrated and described invention has been referred to as having particular utility in the control of either surface units or oven units in domestic appliances such as stoves, and the like, its wider utility in other types of equipment will be readily apparent to those skilled in the art.

Other modes of applying the principle of the invention may be employed, change being made as regards the details described, provided the features stated in any of the following claims or the equivalent of such be employed.

I, therefore, particularly point out and distinctly claim as my invention:

1. An adjustable temperature-responsive control device for electric heating circuits comprising in combination: (a) a control knob adapted to be manually set to a preselected temperature; (b) means responsive to said control knob comprising a first lever arm having a first and second portion, said first portion being pivotally connected on a movable axis with said second portion and said second portion being pivotally mounted on a fixed axis; (c) a second lever arm pivotally mounted on a fixed axis adjacent said first lever arm; (d) contact members mounted on said lever arms, actuating means for cyclically moving said contact members so that during a part of the time span of each of reoccurring cycles said contact members will be in closed condition and during any remainder of each such time span said members will be in open condition; and (e) thermostatically controlled means for varying the time duration relationship between said open and closed condition in each such time span.

2. An adjustable temperature-responsive control device for electric heating circuits comprising in combination: (a) a cam operated by a manually adjustable control knob adapted to be set to a preselected temperature; (b) said cam adapted to move a first lever arm, said arm having a first and second portion, said first portion being pivotally connected connected on a movable axis with said second portion and said second portion being pivotally mounted on a fixed axis; (c) a second lever arm pivotally mounted on a fixed axis adjacent and substantially parallel to said first lever arm, (d) contact members mounted on said lever arms, a motor-actuated cam adapted to cyclically move said second lever arm so that during a part of the time span of each of reoccurring cycles said contact members will be in closed condition and during any remainder of each of such time span said members will be in open condition; and (e) thermostatically controlled means for moving said first lever arm so that the time duration relationship between said open and closed condition in each such time span varies.

3. The structure in claim 2 further characterized, in that, said cam operated by said control knob is mechanically inter-connected with said thermostatic means whereby their stated effects are algebraically cumulative.

References Cited in the file of this patent

UNITED STATES PATENTS

| | | |
|---|---|---|
| 2,500,061 | Clark | Mar. 7, 1950 |
| 2,549,461 | Haller | Apr. 17, 1951 |
| 2,571,822 | Bohn | Oct. 16, 1951 |